US007385473B2

(12) United States Patent
Fabian et al.

(10) Patent No.: US 7,385,473 B2
(45) Date of Patent: Jun. 10, 2008

(54) ONE-SHOT HEAT SENSING ELECTRICAL RECEPTACLE

(75) Inventors: Steven D. Fabian, Port Jefferson, NY (US); Douglas Watchorn, Frenchtown, NJ (US)

(73) Assignee: BSafe Electrix, Inc., Manhasset, NY (US)

( * ) Notice: Subject to any disclaimer, the term of this patent is extended or adjusted under 35 U.S.C. 154(b) by 127 days.

(21) Appl. No.: 11/243,685

(22) Filed: Oct. 4, 2005

(65) Prior Publication Data

US 2006/0028316 A1 Feb. 9, 2006

Related U.S. Application Data

(63) Continuation-in-part of application No. 11/088,374, filed on Mar. 24, 2005.

(60) Provisional application No. 60/556,195, filed on Mar. 25, 2004.

(51) Int. Cl.
*H01H 61/00* (2006.01)
*H01H 61/01* (2006.01)
*H02H 3/00* (2006.01)

(52) U.S. Cl. ............................ 337/36; 337/16; 337/91; 337/113; 361/42

(58) Field of Classification Search .................. 337/16, 337/36–39, 380, 91, 113; 361/42
See application file for complete search history.

(56) References Cited

U.S. PATENT DOCUMENTS

| | | | | |
|---|---|---|---|---|
| 2,789,255 | A * | 4/1957 | Mekler | 361/49 |
| 3,169,239 | A * | 2/1965 | Lacey | 340/638 |
| 3,539,867 | A * | 11/1970 | William | 361/45 |
| 3,781,857 | A * | 12/1973 | Stendig et al. | 340/521 |
| 3,913,046 | A * | 10/1975 | Davis et al. | 337/13 |
| 4,001,647 | A * | 1/1977 | Klein et al. | 361/42 |
| 4,538,134 | A * | 8/1985 | Carey | 337/113 |
| 4,570,145 | A * | 2/1986 | Carey | 337/113 |
| 4,951,025 | A * | 8/1990 | Finnegan et al. | 337/113 |
| 5,374,199 | A * | 12/1994 | Chung | 439/188 |
| 5,526,225 | A * | 6/1996 | Wang | 361/643 |
| 5,590,010 | A * | 12/1996 | Ceola et al. | 361/93.4 |
| 5,594,398 | A * | 1/1997 | Marcou et al. | 335/18 |
| 5,933,063 | A * | 8/1999 | Keung et al. | 335/18 |
| 6,040,967 | A * | 3/2000 | DiSalvo | 361/42 |
| 6,252,407 | B1 * | 6/2001 | Gershen | 324/509 |
| 6,262,871 | B1 * | 7/2001 | Nemir et al. | 361/42 |
| 6,282,070 | B1 * | 8/2001 | Ziegler et al. | 361/42 |
| 6,288,882 | B1 * | 9/2001 | DiSalvo et al. | 361/42 |
| 6,433,555 | B1 * | 8/2002 | Leopold et al. | 324/509 |
| 6,477,021 | B1 * | 11/2002 | Haun et al. | 361/42 |
| 6,734,769 | B1 * | 5/2004 | Germain et al. | 335/6 |
| 6,788,173 | B2 * | 9/2004 | Germain et al. | 335/18 |
| 6,979,787 | B2 * | 12/2005 | Davies | 200/51 R |
| 2002/0180451 | A1 * | 12/2002 | Leopold et al. | 324/509 |
| 2003/0102944 | A1 * | 6/2003 | Leopold et al. | 335/18 |
| 2004/0100354 | A1 * | 5/2004 | Davis et al. | 337/356 |
| 2004/0140117 | A1 * | 7/2004 | Kim et al. | 174/53 |

(Continued)

*Primary Examiner*—Anatoly Vortman
*Assistant Examiner*—Bradley H Thomas
(74) *Attorney, Agent, or Firm*—Brenda Pomerance

(57) ABSTRACT

An electrical receptacle senses its operating temperature and automatically turns off when the temperature rises above a predetermined threshold. The receptacle has a button that visually indicates when the receptacle has reached its temperature threshold. After automatically turning off, the receptacle remains permanently non-conducting.

6 Claims, 6 Drawing Sheets

U.S. PATENT DOCUMENTS

2004/0212466 A1* 10/2004 Germain et al. .............. 335/18
2005/0105228 A1* 5/2005 Kim et al. .................... 361/85
2005/0162789 A1* 7/2005 Germain et al. .............. 361/42
2005/0236557 A1* 10/2005 Hurst ..................... 250/214 R

* cited by examiner

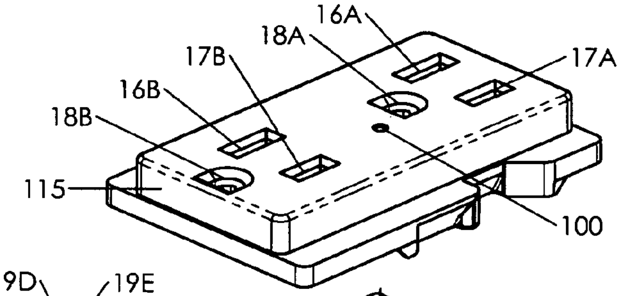
FIG. 4A
FIG.4D
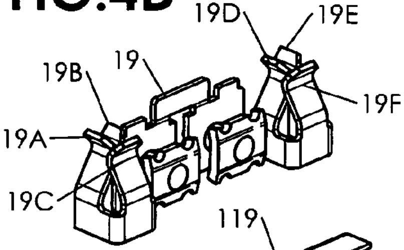
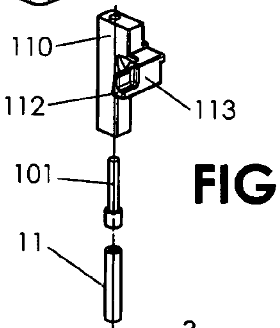
FIG. 4B
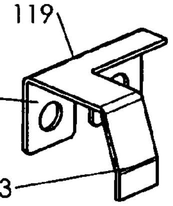
FIG.4H
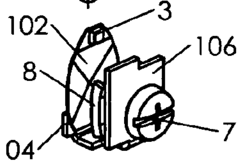
FIG. 4C
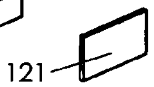
FIG.4I
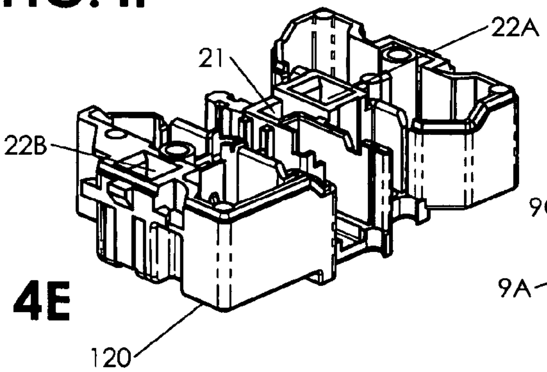
FIG. 4E
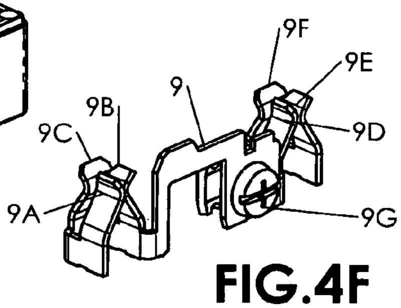
FIG.4F
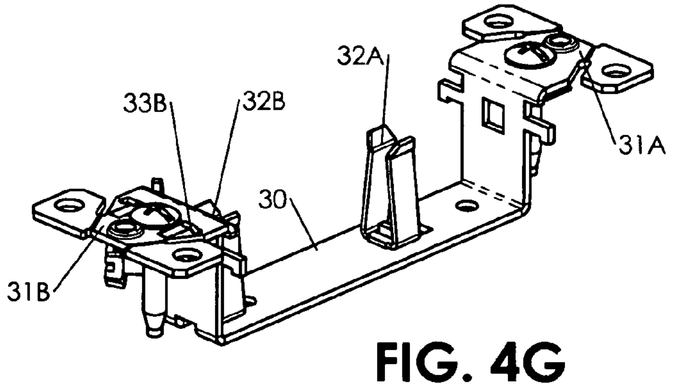
FIG. 4G

ONE-SHOT HEAT SENSING ELECTRICAL RECEPTACLE

CROSS-REFERENCE TO RELATED APPLICATIONS

This application is a continuation-in-part of U.S. patent application Ser. No. 11/088,374, HEAT SENSING ELECTRICAL RECEPTACLE, filed Mar. 25, 2005, having a common inventor and a common assignee herewith, the disclosure of which is hereby incorporated by reference.

BACKGROUND OF THE INVENTION

The present invention relates to a receptacle having at least one electrical outlet, and more particularly, is directed to an electrical outlet that senses the ambient temperature, the receptacle temperature and the temperature of a prong of an electrical plug inserted into the outlet, and that automatically shuts off when any of these temperatures is too hot, and has a reset button for resuming operation.

Many fires are believed to be caused by overloaded electrical outlets, that is, outlets operated with more power transfer than the outlet was designed for. Fires are sometimes caused by a loose connection, a glowing connection and/or a high resistance path. A glowing connection occurs when copper oxide is formed between a copper wire and a steel screw in a small air gap creating carbon which glows.

The condition of too much power usage is always accompanied by increased temperature in at least one of the ambient temperature, the receptacle temperature and the temperature of a prong of an electrical plug inserted into the receptacle, collectively referred to herein as "operating temperature". To avoid fires, it is desirable for the outlet to sense when the operating temperature is too hot, and to cease operation.

Bimetallic switches are electromechanical thermal sensors. The bimetallic or bi-metal portion consists of two different metals bonded together such as brass and Invar. Some bimetallic portions consist of three layers sandwiched together. The metals expand at different rates as they warm, causing the element to twist or curve. The changing geometry is used to make or break an electrical contact. Once temperature has returned to normal levels, they revert back to their original geometry.

For a bi-metal comprising brass and invar, the bending occurs at a metal temperature of about 200° F.; the actual temperature threshold is determined by the design of the bimetal and its materials. The metal can be heated by a loose connection or by ambient air temperature. Typical plastic household wiring insulation and outlet housing melts at a temperature of about 300° F. but operation above 200° F. is not recommended due to its high probability of material distortion.

U.S. Pat. No. 6,166,618 (Robertson) discloses an outlet having a bimetallic dome that interrupts electrical contact when the temperature rises above a predetermined threshold. FIGS. 9 and 10 of the Robertson patent shows electrical contacts 76*c*, 66*c*. At the bottom of FIG. 9, bimetallic dome 106 is shown in its reset (conducting) state. As the temperature rises above the operating threshold of bimetallic dome 106, it flips from a convex to a concave form. At the top of FIG. 9, there is a bimetallic dome in its tripped (non-conducting state), wherein the section of electrical contact 76*c* is electrically disconnected from contact member 66*c*. When the bimetallic dome changes shape, it pushes dielectric rod 110 outwards through hole 108, as shown in FIG. 10 of the Robertson patent. Dielectric rod 110 can be manually depressed to reset the bimetallic dome.

The Robertson configuration has several drawbacks. First, a bimetallic dome is associated with each of the outlets in a duplex receptacle, increasing the cost of the receptacle. Second, the dielectric rod is positioned such that the faceplate of the receptacle must be removed to access the dielectric rod, which is inconvenient. Also, the location of the dielectric rod makes it impossible to quickly see that it has tripped. Third, as the bimetallic dome cools below its operating threshold, it can reset itself back to its original configuration. This automatic resetting can be dangerous to a person working around the outlet; in particular, a worker can be electrocuted by the sudden resumption of current. Fourth, although one outlet of a duplex outlet may be tripped, the other outlet will continue functioning, implying to a casual observer that the first outlet is dead rather than tripped, which could result in worker electrocution.

The Robertson patent also discloses another embodiment, shown in FIG. 11 thereof, having dish-shaped bimetallic portions 80 that reset on their own as the operating temperature cools. A reset button is absent.

Once the temperature has increased to the triggering threshold of the receptacle, it is desirable for an electrician to examine the environment of the receptacle to determine the source of the unusual heat. That is, after the receptacle has been triggered to its non-conducting state, it should remain in its non-conducting state forever, to force examination of its environment.

Thus, there is a need for an outlet that is sensitive to heat and avoids undesirable operation.

SUMMARY OF THE INVENTION

In accordance with an aspect of this invention, there is provided an electrical receptacle including a live terminal having a first contact, a power interruption device with a bimetallic portion having a second contact that electrically contacts the first contact in a normal operating state, and a resettable arm for preventing the first contact from touching the second contact when the power interruption device is in a tripped state, wherein, after the power interruption device is in its tripped state, it is unable to return to its normal operating state.

According to a further aspect of the invention, the bimetallic portion is dish-shaped. The resettable arm is attached to an overload button that indicates when the receptacle reaches a temperature threshold. The electrical receptacle also includes a faceplate, and the overload button extends outward from the faceplate while in the tripped state. Generally, the overload button visually indicates when the electrical receptacle is in a tripped state. The electrical receptacle also includes a spring that pushes the resettable arm between the first contact and the second contact when the electrical receptacle enters the tripped state.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 4A-4I are three-dimensional views of subassemblies of the electrical receptacle package shown in FIG. 1;

DETAILED DESCRIPTION

An electrical receptacle senses its operating temperature and automatically turns off when the temperature rises above a predetermined threshold. The receptacle has a button that visually indicates when the receptacle has reached its temperature threshold. After automatically turning off, the receptacle remains permanently non-conducting.

Figure 1A:
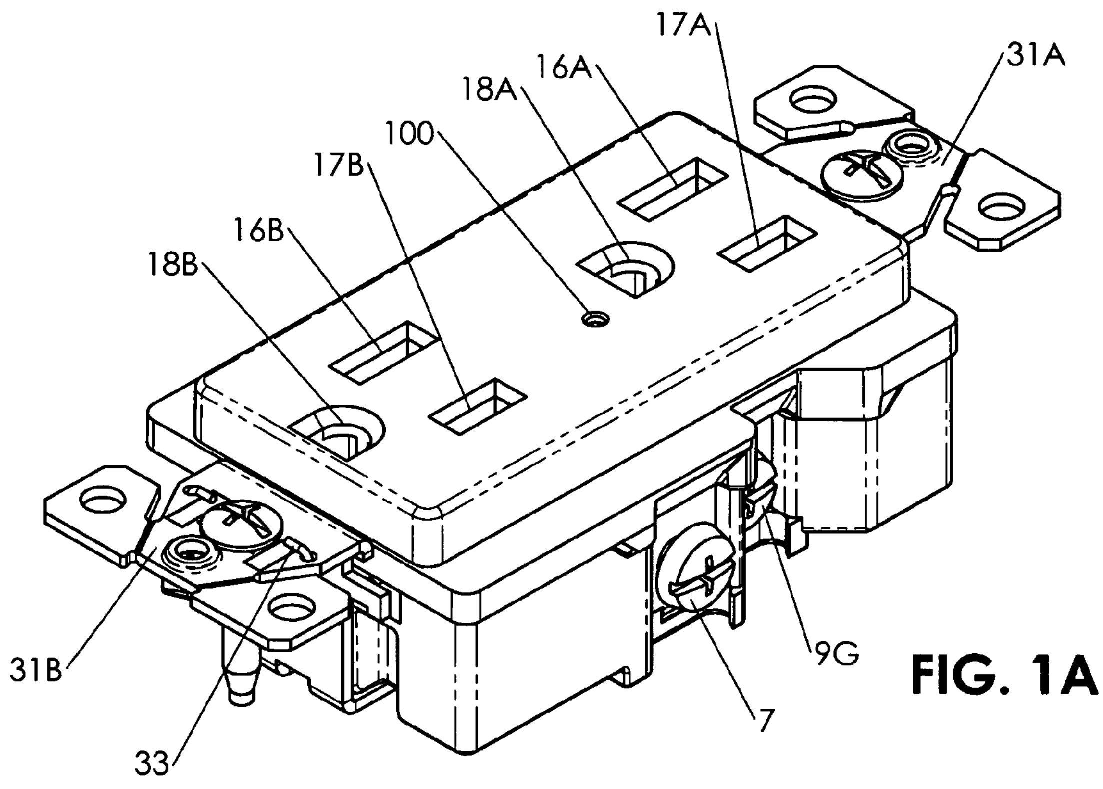
FIGS. 1A and 1B, collectively referred to as FIG. 1, are three-dimensional views of an electrical receptacle package according to the present invention.
Figure 1B:
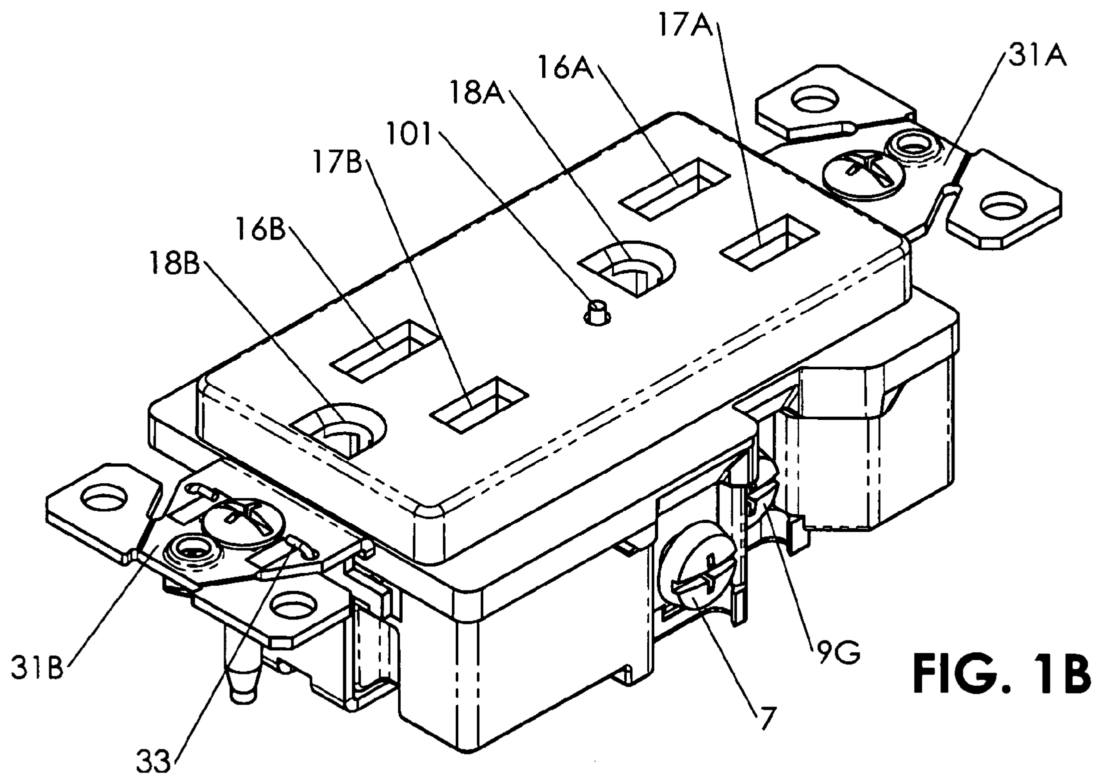

FIGS. 1A and 1B, collectively referred to as FIG. 1, are three-dimensional views of the electrical receptacle package of the present invention. The receptacle has a top outlet and a bottom outlet. Each outlet is adapted to receive the blades of a 3-prong plug comprising a neutral (N) terminal, a load (L) terminal and a ground terminal, or a 2-prong plug comprising a neutral terminal and a load terminal. The load terminal is sometimes referred to as the live or line terminal. Specifically, the top outlet has neutral slot 16A, live slot 17A and ground slot 18A, while the bottom outlet has neutral slot 16B, live slot 17B and ground slot 18B. Screw 7 indicates the line terminal, screw 9G indicates the feed terminal, a screw (not shown) on the occluded side of the receptacle indicates the neutral terminal, and mounting tabs 31A, 31B are provided. Ground wire 33 ensures that mounting tab 31B is grounded to the mounting box for the receptacle (not shown). Typically, electrical receptacles are connected in parallel via the household wiring. Generally, the line terminal serially couples to a thermal interrupt that serially couples to the feed (load) terminal.

Aperture 100 is located between the top outlet and the bottom outlet.

As shown in FIG. 1A, during normal operation, the top of overload button 101 (not visible in FIG. 1A) does not protrude from aperture 100 and is approximately flush with the receptacle packaging. A thermal interrupt, discussed below, is located between the line terminal of the receptacle and the live terminals of the outlets. The thermal interrupt functions to interrupt the contact between the household wiring and the portion of the receptacle in contact with the blades of the electrical plug inserted into the top outlet or the bottom outlet. The thermal interrupt also prevents power from reaching any downstream outlets connected via the household wiring; downstream outlets are assumed to be on the feed (load) side.

As shown in FIG. 1B, when the thermal interrupt triggers, overload button 101 pops outward to protrude from the receptacle packaging. Generally, the top of overload button is the same color as the faceplate of the electrical receptacle package, while the sides of overload button are a high contrast color, to improve the visibility of overload button 101 after it pops.

The receptacle package shown in FIG. 1 is approximately the same size as a standard two-outlet electrical receptacle having dimensions 2.64×1.33 inches, with a depth of 1.1 inches.

Figure 2:
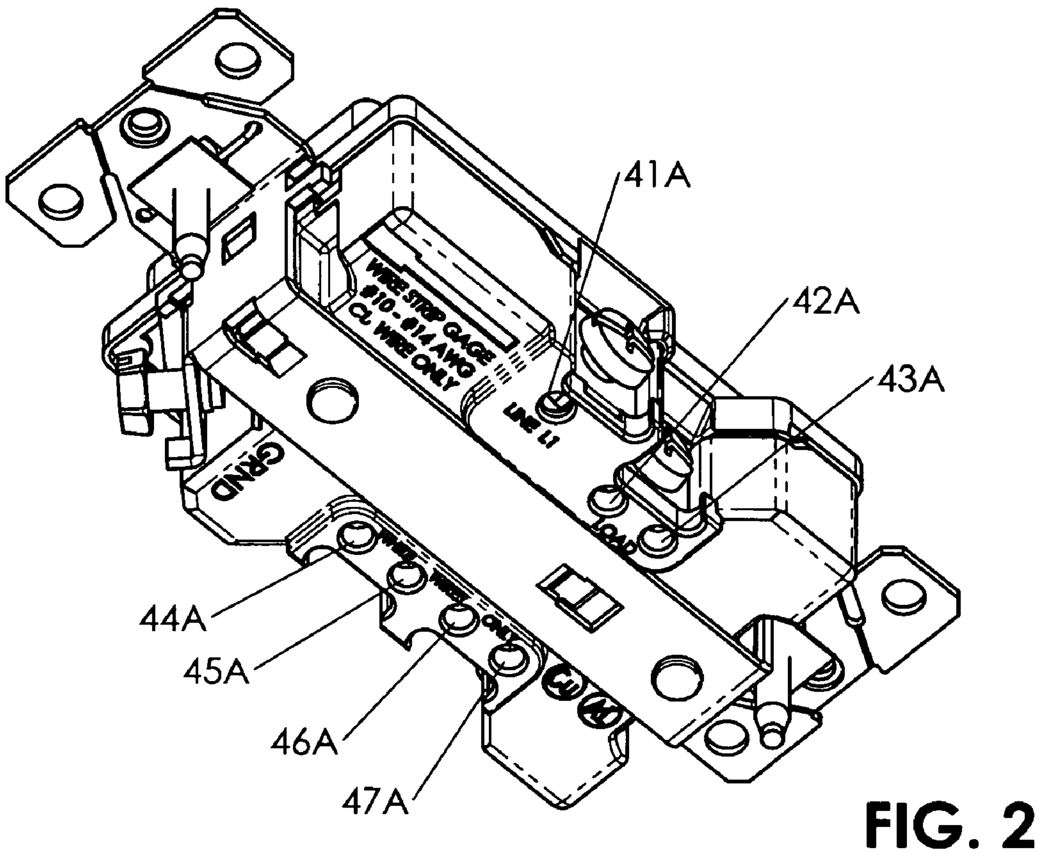
FIGS. 2 and 3 are three-dimensional views of the underside of the electrical receptacle package shown in FIG. 1 showing different types of wire connections.
Figure 3:
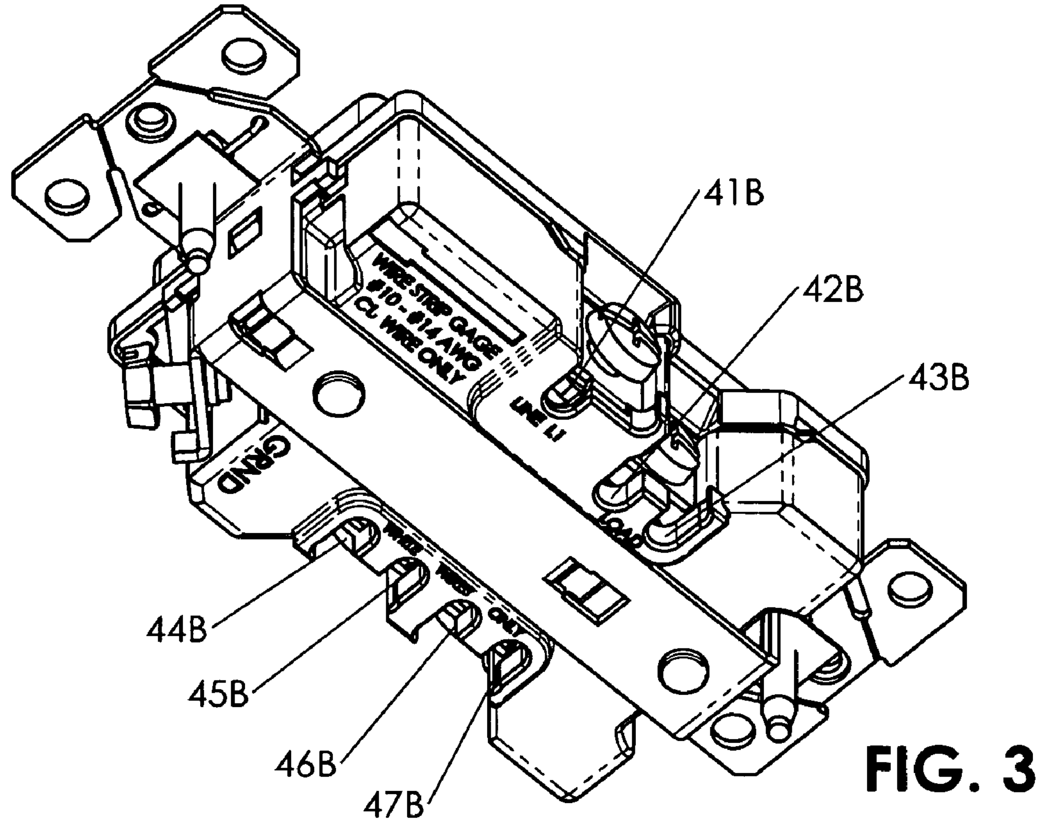

FIGS. 2 and 3 are three-dimensional views of the underside of the electrical receptacle package shown in FIG. 1 showing different types of wire connections. Generally, wires can be coupled to receptacles via the side-wire method, in which wire is wrapped under a screwhead, the back-wire method, in which wire is inserted from behind through a hole or slot and clamped under a clamping plate as the screw is tightened, or the push-wire method, in which a wire is simply pushed into a terminal and clamped by a spring-loaded brass member inside the terminal. The push-wire method causes many loose connections, and is not favored for this reason. FIG. 2 shows a back-wire configuration with holes 41A-47A; FIG. 3 shows a back-wire configuration with slots 41B-47B.

FIGS. 4A-4I are three-dimensional views of subassemblies of the electrical receptacle package shown in FIG. 1.

FIG. 4A shows faceplate 115 having neutral slots 16A, 16B, live slots 17A, 17B, ground slots 18A, 18B, and aperture 100 for overload button 101.

Figure 6A:
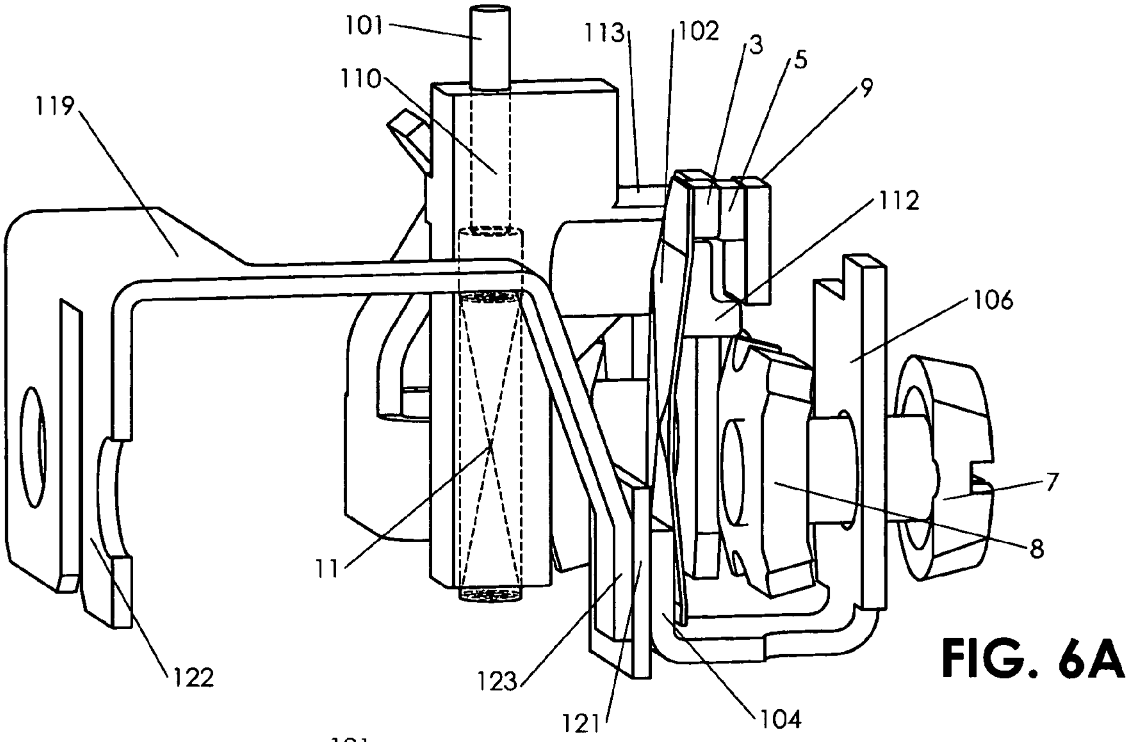
FIG. 6A is a three-dimensional view of the thermal interrupt in its reset state.
Figure 6B:
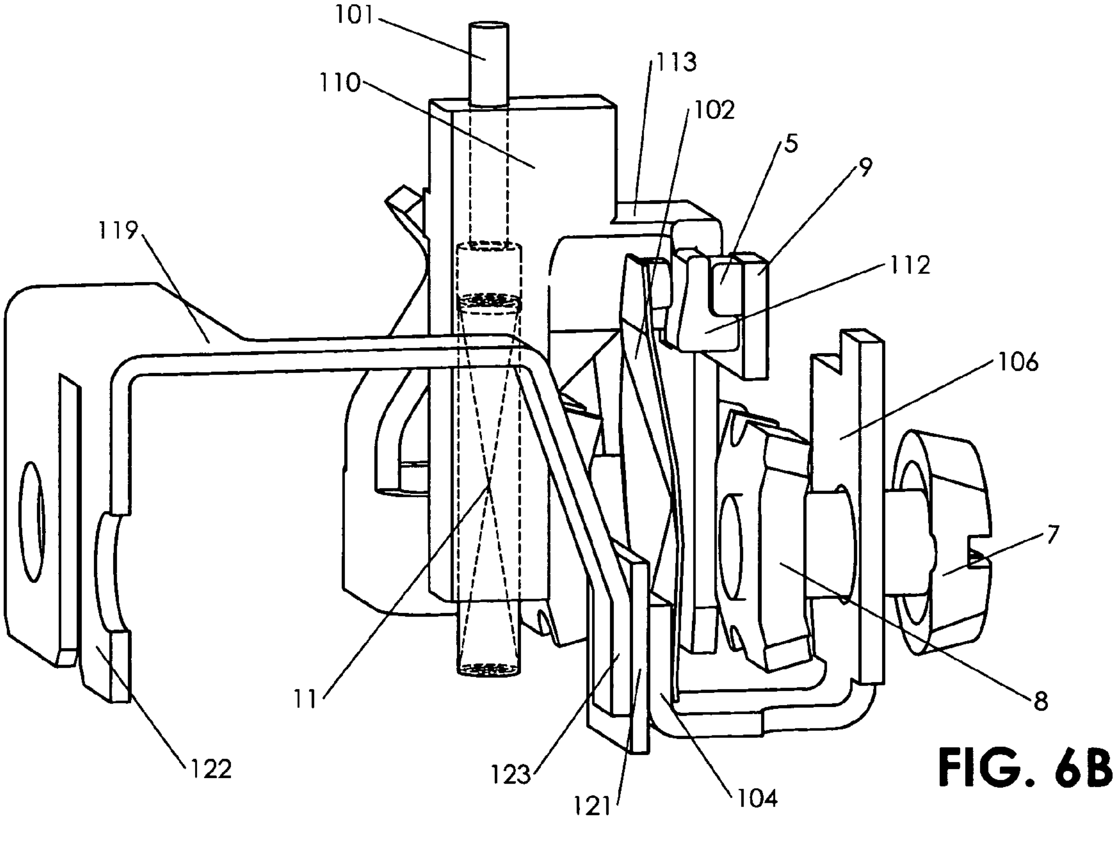
FIG. 6B is a three-dimensional view of the thermal interrupt in its tripped state.

FIG. 4B shows an overload button assembly including housing 110, overload button 101 and spring 11, with a vertical line indicating their respective alignment. Housing 110 has a columnar shape with a ton surface having a hole. Housing 110 has extension portion 113 located at its midsection, and arm 112 formed at the distal end of extension portion 113. Housing 110 has a vertical cavity extending from the hole in its top to its bottom. Overload button 101 has the form of an elongated cylinder atop a shorter support cylinder, with the elongated cylinder adapted to be enclosed by an upper portion of the vertical cavity in housing 110. Overload button 101 has a top surface for protruding through the hole in the top surface of housing 110. Spring 11 is located in a lower portion of the vertical cavity in housing 110, and serves to push up overload button 101, as best seen in FIGS. 6A and 6B.

Figure 7:
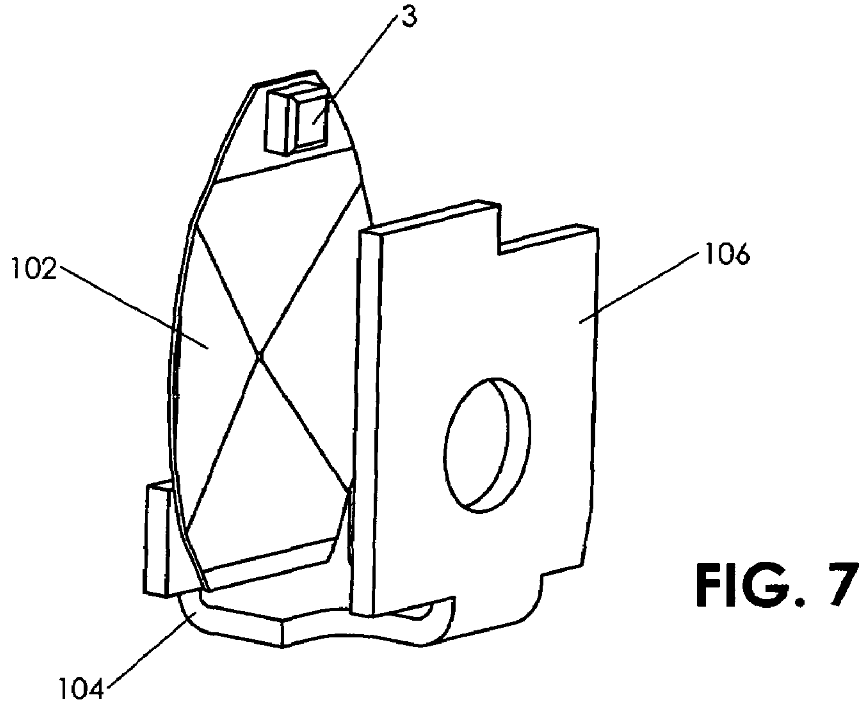
FIG. 7 is a three-dimensional view of the bi-metal portion of the thermal interrupt mechanism.

FIG. 4C shows the bimetallic line terminal subassembly. As shown in FIG. 7, bimetallic member 102 has base 104 and silver contact 3 fastened to its top, such as by spot welding. Practically, the silver contact is usually a silver coating on a nickel backing. Instead of silver, any other conductive substance may be used, such as gold. Bimetallic member 102 generally has the shape of a shallow concave dish. Bimetallic member 102 is formed of three layers sandwiched together: Alloy 721 (manganese, copper, nickel) on the expansion side, copper in the middle, and Invar (nickel, iron) on the low expansion side. Base 104 is fastened to line terminal 106 such as by spot welding. Returning to FIG. 4C, screw 7 passes through line terminal 106 and is threaded into clamping plate 8.

The present invention and the bimetallic device described in the '374 application function in the same way in their untripped (normal operating) states: a spring pushes a button (overload button or reset button) and a housing against the contact on the bimetallic member; the bimetallic member stops the button from moving up. In the normal operating state, the contact on the bimetallic member and the contact on the feed terminal assembly are in electrical contact.

The present invention and the '374 bimetallic device also function in the same way going from their untripped to tripped states: when the bimetallic member flexes (activates), the spring is allowed to push the button and housing to their tripped position, electrically isolating the contact on the bimetallic member from the contact on the feed terminal subassembly.

The present invention and the '374 bimetallic device differ in that, when in the tripped state, pressing down on the overload button does not affect the housing in the present invention, whereas in the '374 bimetallic device, pressing down on the reset button pushes down the housing so that the contacts on the bimetallic member and the feed terminal subassembly re-engage, and the receptacle returns to its normal operating state.

FIG. 4D shows neutral terminal subassembly 19 having a left triple wipe basket with prongs 19A, 19B, 19C and a right triple wipe basket with prongs 19D, 19E, 19F. The triple wipe baskets are configured for a 15 amp, 120 volt plug, but in other embodiments also accommodate a 15 amp, 240 volt plug; a 20 amp, 120 volt plug; or a 20 amp, 240 volt plug.

In the United States, a 240 volt plug has two hot legs each having 120 volts. In Europe, a 240 volt plug has one neutral leg and one hot leg having 240 volts. Accordingly, for a United States 240 volt plug, a single bimetal thermal interrupt must be configured to open the contacts corresponding to both of the hot legs, or a bimetal thermal interrupt must be associated with each of the hot legs.

FIG. 4E shows plastic base 120 having overload button compartment 21 and ground terminal holes 22A, 22B. Neutral terminal subassembly 19, shown in FIG. 4D, fits into the left side of plastic base 20, while feed terminal subassembly 9, shown in FIG. 4F, fits into the right side of plastic base 20.

Figure 8:
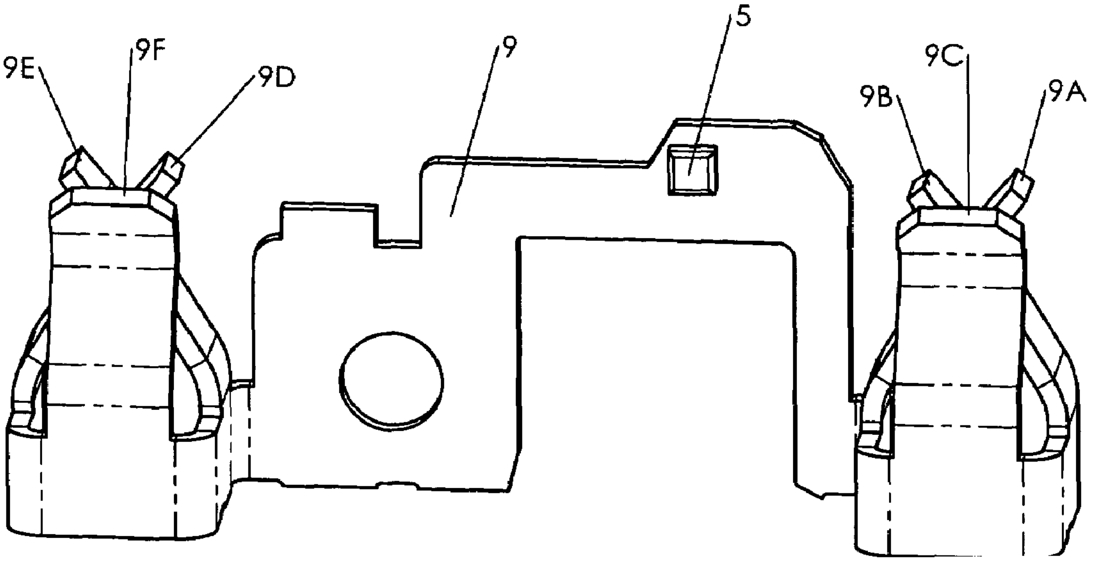
FIG. 8 is a three-dimensional view of the contact portion of the thermal interrupt mechanism.

FIG. 4F shows feed terminal subassembly 9 having a left triple wipe basket with prongs 9A, 9B, 9C and a right triple wipe basket with prongs 9D, 9E, 9F. Feed terminal subassembly 9 also has screw 9G inserted therein. As shown in FIG. 8, silver contact 5 is spot welded on feed terminal subassembly 9.

FIG. 4G shows grounding strap subassembly 30 having mounting tabs 31A, 31B and ground prongs 32A, 32B. After the screws in mounting tabs 31A, 31B are tightened, grounding wire 33B (shown as grounding wire 33 in FIG. 1B) serves to electrically connect grounding strap subassembly 30 to a metal box (not shown) placed in the wall.

FIG. 4H shows bridge 119 having leg 122 with a hole, and leg 123 including a bend.

FIG. 4I shows insulator 121.

The operation of bridge 119 and insulator 121 is described below with respect to FIGS. 6A and 6B.

The neutral, live and ground blades of a three-prong plug are inserted through slots 16A, 17A, 18A of FIG. 4A. The neutral blade then rests in right triple wipe basket having prongs 19D, 19E, 19F of FIG. 4D, while the live blade then rests in right triple wipe basket having prongs 9D, 9E, 9F of FIG. 4F. The ground blade passes through ground terminal hole 22A of base 120 of FIG. 4E and thence to ground prongs 32A of ground strap 30 of FIG. 4G.

Figure 5A:
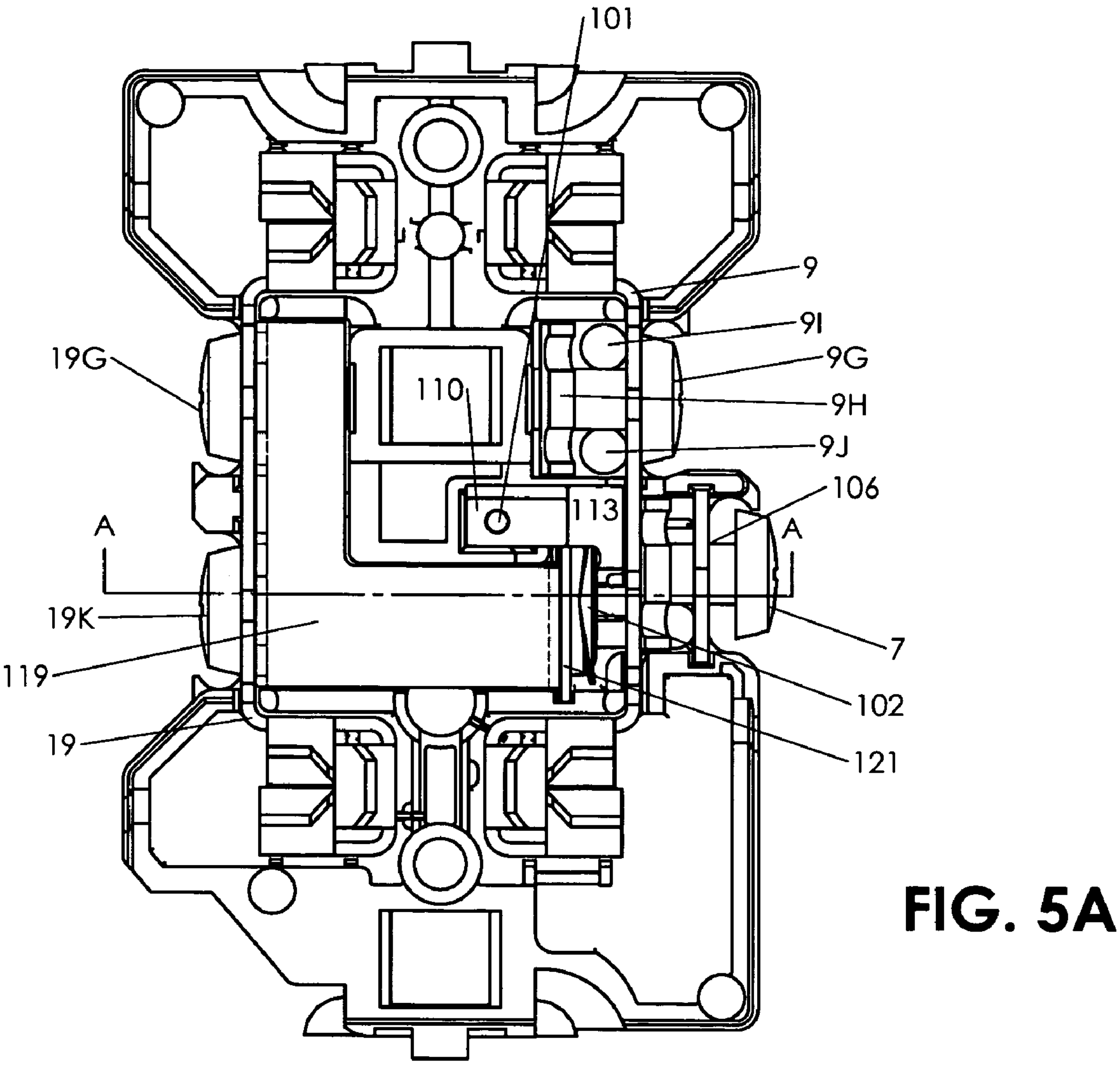
FIG. 5A is a top-down view of the electrical receptacle with its outer package removed.

FIG. 5A is a top-down view of the electrical receptacle with its outer package removed. At the left, neutral subassembly 19 includes screws 19G, 19K, clamping plates 19H, 19N, and holes for neutral wire 19I, 19J, 19L, 19M. A similar configuration exists at the right for feed subassembly 9. Part of feed subassembly 9 is occluded by the bimetal subassembly and overload button, which are better viewed in FIG. 5B.

Figure 5B:
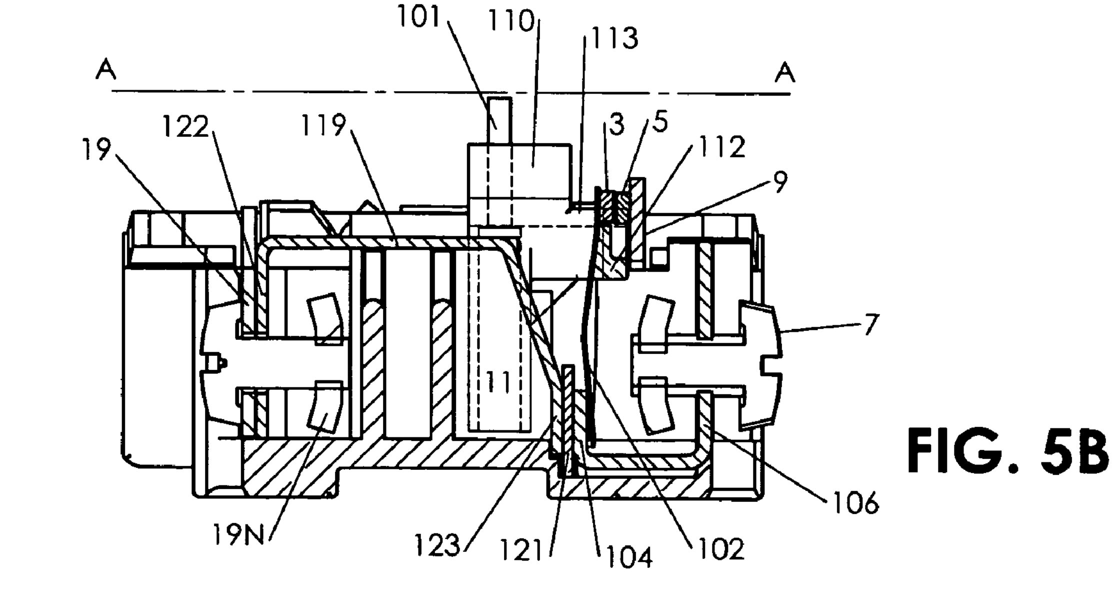
FIG. 5B is a depth view across reference line AA in FIG. 5A.

FIG. 5B is a depth view across reference line AA in FIG. 5A. Overload button 101 has spring 11 at its interior extension portion. Housing 110 encloses overload button 101, and base 113 of housing 110 is adjacent to the back side of bimetallic member 102, which has silver contact 3 fastened to the top of its front side. Base 104 of the bimetallic assembly is fastened to line terminal 106. Silver contact 5 opposes silver contact 3; silver contact 5 is welded to feed terminal 9. Screw 7 is inserted through a hole in line terminal 106 and fastened with clamping plate 8. Neutral terminal subassembly 19 is adjacent to leg 122 of bridge 119. Leg 123 of bridge 119 is adjacent to insulator 121. Insulator 121 serves to electrically insulate leg 123 from base 104 of the bimetallic assembly.

FIG. 6A is a three-dimensional view of the thermal interrupt in its normally closed state. Arm 112 of housing 110 is seen to be below contacts 3 and 5 that are in contact with each other. At a normal operating temperature, bimetallic member 102 bends inwards, resisting the tendency of arm 112 to move upwards. As the ambient temperature increases, bimetallic member 102 bends so as to move contact 3 away from contact 5, allowing spring 11 to push overload button 101 upwards. Overload button 101 causes housing 110 to move upwards, which moves extension portion 113 upwards, and arm 112 is moved upwards between silver contacts 3, 5, thus interrupting power flow.

FIG. 6B is a three-dimensional view of the thermal interrupt in its tripped state. Overload button 101 and housing 110 are elevated such that arm 112 abuts against contact 5. The body of arm 112 prevents contact 3 from touching contact 5 even if bimetallic dish 2 tries to change shape on its own, such as after the temperature cools. There is no way to return from the configuration of FIG. 6B to that of FIG. 6A. Depressing overload button 101 pushes spring 11 down, but does not affect the position of housing 110. After overload button 101 is released, spring 11 returns overload button 101 back to its tripped state. The normal operating state can not be entered. Accordingly, an electrician must replace the receptacle.

The present invention has various advantages. There is only one bimetallic device per duplex receptacle, reducing the cost of thermal overload protection. The overload button is positioned so that it is easy to see when the device has tripped. The device cannot reset under any circumstances.

The present invention has been described with respect to a duplex receptacle. In another embodiment, the present invention is applied in a wall adapter outlet. Specifically, a portable unit having duplex outlets with thermal interrupt protection is plugged into a wall receptacle having duplex outlets lacking thermal interrupt protection.

In yet another embodiment, the present invention is applied in a power strip comprising a plurality of receptacles, the power strip being plugged into a standard outlet. The power strip has one bimetallic subassembly for all of its receptacles. If the power strip is long, a sensor and relay are provided so that the bimetallic subassembly can react to operating temperatures throughout the power strip.

Most households include ground fault interrupt (GFI) electrical receptacles in areas that are moist, such as bathrooms. A ground fault is an unintended leakage of current to ground, possibly through a person. The regular grounding system protects the equipment that is attached (or plugged in) to the circuit against a ground fault in it. GFI devices are designed to protect people, not equipment.

A GFI receptacle shuts down the protected electric circuit—opens it—when it senses an unexpected loss of power, to ground. GFI protection devices constantly monitor and compare the amount of power flowing from the panel on the hot or phase wire and the amount returning on the neutral wire. Any time the current on the hot leg and the neutral leg are unequal, the protection device will trip and open the circuit. GFI devices work by passing both the hot wire and the neutral wire through a sensor such as a differential transformer and connecting the sensor to a solenoid or relay that opens switch contacts built into the power conductors inside the device—in front of the transformer. When it is working properly, a GFI device will open its protected circuit when the difference between the current coming in and the current going out reaches 0.005 ampere.

A GFI receptacle typically has a reset button. Due to its elaborate circuitry, a GFI receptacle is substantially more expensive than a regular receptacle.

The present temperature sensing features could be added to a GFI receptacle.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An electrical receptacle, comprising:

a line terminal having a first contact and a bimetallic dish, a feed terminal having a second contact, and an overload button assembly having (a) a columnar housing with (i) a top surface having a hole, (ii) an extension portion located on one side of the columnar housing, the extension Portion having an arm at its distal end, and (iii) a cavity extending the full height of the columnar housing and terminating on the top surface at the hole, (b) a cylindrical button having a top surface for protruding through the hole in the columnar housing, and a body located in an upper portion of the cavity in the columnar housing, and (c) a spring located in a lower portion of the cavity in the columnar housing, wherein, in a normal reset state, the bimetallic dish bends inward so that the first and second contacts touch and the overload button assembly is in an untripped postion, and in a tripped state, the bimetallic dish bends outward enabling the spring to push the arm of the overload button assembly between the first and second contacts so that the overload button assembly moves to a tripped position wherein the columnar housing is unaffected by movement of the cylindrical button, thereby permanently preventing the first contact from touching the second contact.

2. The electrical receptacle of claim 1, further comprising a faceplate, and wherein the overload button extends outward from the faceplate while in the tripped state.

3. The electrical receptacle of claim 1, wherein the overload button visually indicates when the electrical receptacle is in a tripped state.

4. The electrical receptacle of claim 1, wherein the bimetallic dish changes from bending inwards to bending outwards at a predetermined temperature.

5. The electrical receptacle of claim 1, wherein the bimetallic dish is shallow and not dome-shaped.

6. The electrical receptacle of claim 1, wherein the electrcal receptacle has at least two outlets, and in the tripped state, power is prevented from flowing in all of the at least two outlets.

* * * * *